Oct. 5, 1971  M. J. FUHRMAN ET AL  3,609,905
HUNTER'S BLIND
Filed Aug. 1, 1969  3 Sheets-Sheet 1
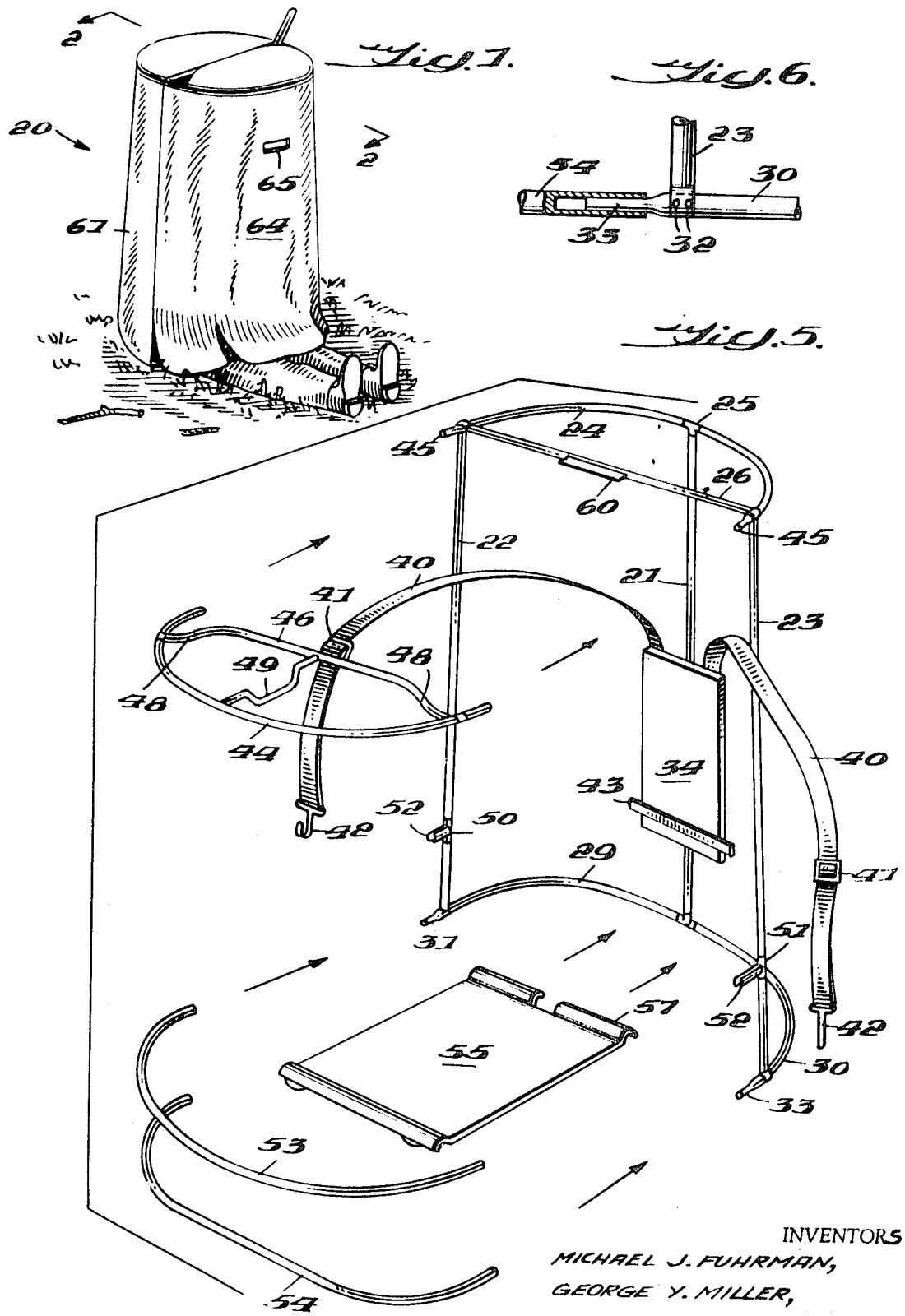
INVENTORS
MICHAEL J. FUHRMAN,
GEORGE Y. MILLER,
BY Kimmel, Crowell & Weaver
ATTORNEYS

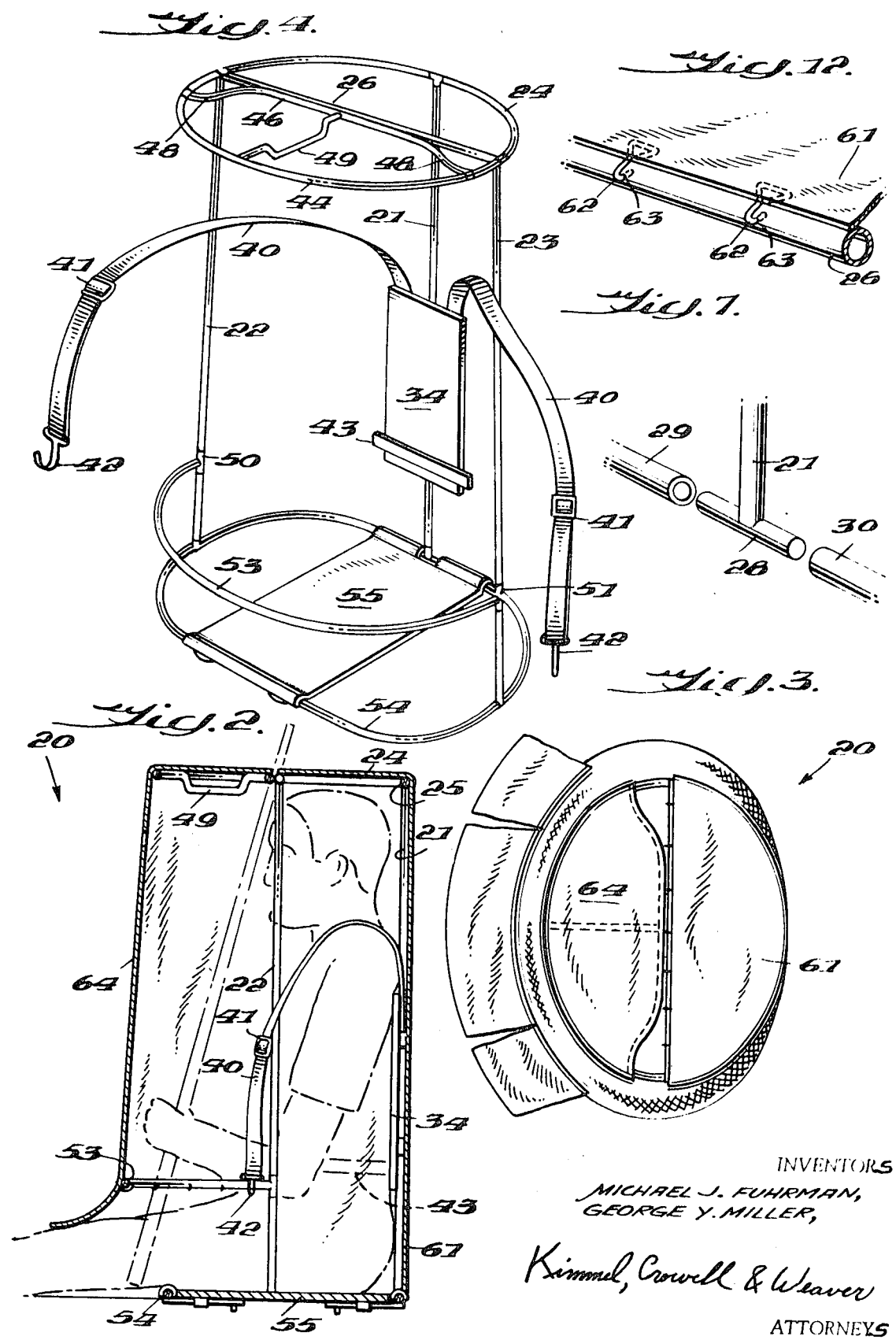

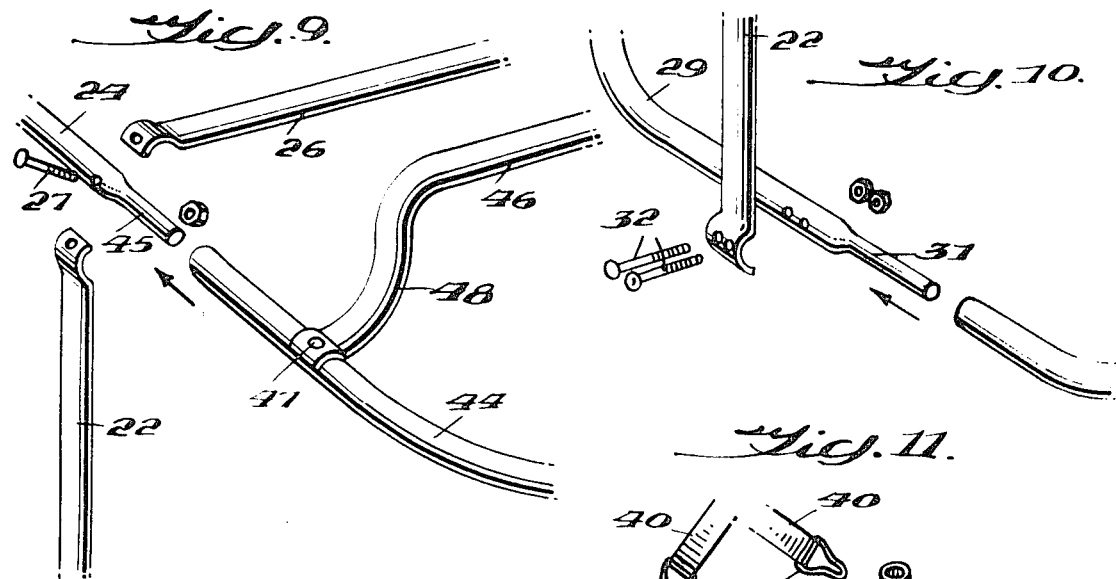
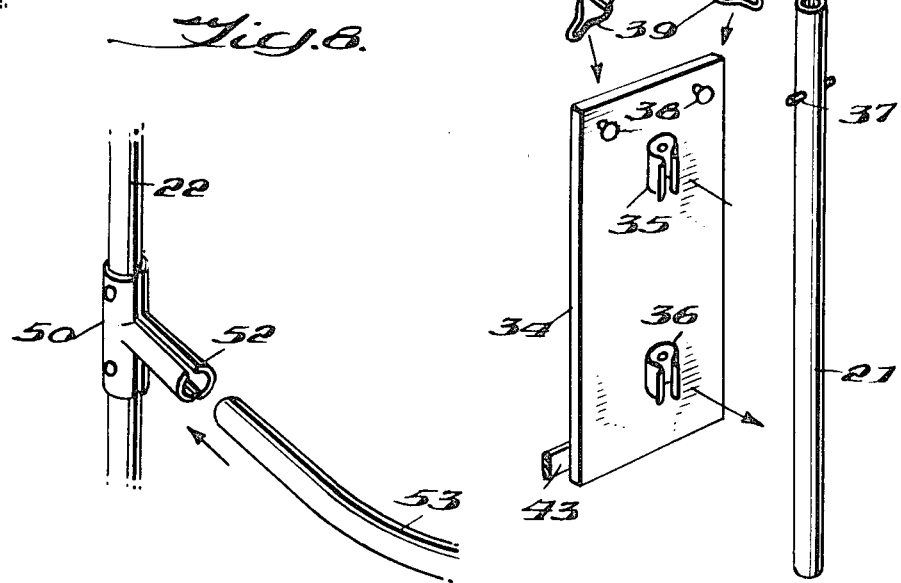
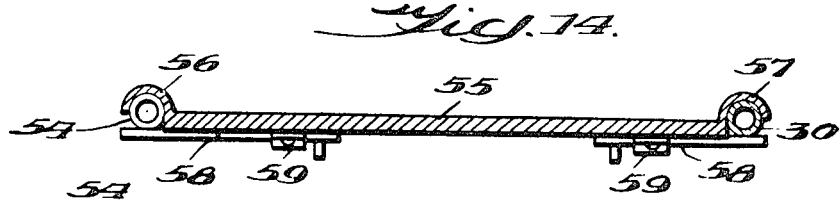
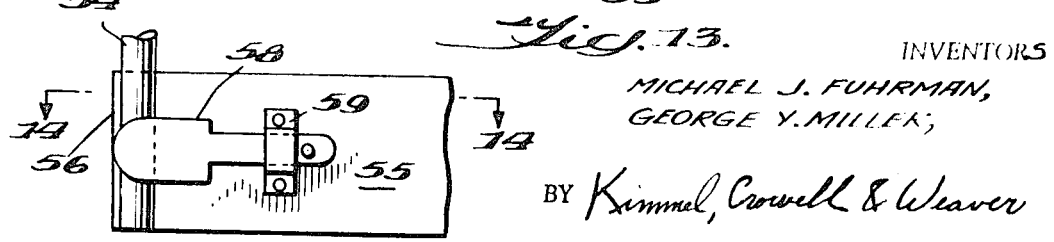

United States Patent Office 3,609,905
Patented Oct. 5, 1971

3,609,905
HUNTER'S BLIND
Michael J. Fuhrman, 409 Euclid Ave., Lorain, Ohio 44052, and George Y. Miller, 458 Sunset Drive, Amherst, Ohio 44001
Filed Aug. 1, 1969, Ser. No. 846,827
Int. Cl. A01m *31/02*
U.S. Cl. 43—1                                    6 Claims

ABSTRACT OF THE DISCLOSURE

A portable hunter's blind which completely encompasses the upper torso of the hunter and is strapped to his body so as to be carried easily from place to place. The blind includes a drop front which can be lowered when shooting and is arranged with the hunter in a seated position with the blind giving the appearance of a stump or other non-human form. The blind is formed of tubular lightweight material covered with a cloth of a nature which permits the hunter visibility while not permitting him to be seen by the hunted game.

BACKGROUND OF THE INVENTION

Field of the invention

The invention is directed to a blind for hunters hunting game which would normally spook if an uncamouflaged hunter were to appear in their visual range. The blind in use resembles an old stump and becomes a natural part of the terrain. The blind is portable, being strapped to the back of the hunter and has a drop front permitting the gun to be swung into firing position without undue delay.

Description of the prior art

Prior art hunter's blinds are generally intended for covering the complete body of the hunter and if portable, either must be taken apart or are so large as to be quite awkward to move through the woods and fields to a hunting position. Most hunter's blinds are semi-permanent in nature with the hunter going to and from the blind in its relatively fixed position rather than moving the blind to his position for hunting, on his back.

SUMMARY OF THE INVENTION

The present invention consists of a lightweight tubing frame which can be adjustably and releasably secured to the back of a hunter in which position it can be carried to the desired site for hunting. With the seat in place on the lower frame and the drop front in its erected position, the effect is that of a stump blending naturally into the surroundings with no indication that a hunter is close by. When game comes into range, the hunter lowers the drop front and brings his weapon to his shoulder and proceeds to fire into the game at will. After the game has passed or been killed, the hunter quickly replaces the drop front concealing himself again from game which may be moving into the area.

BRIEF DESCRIPTION OF THE DRAWINGS

FIG. 1 is a perspective view of the invention shown in closed position while awaiting game;

FIG. 2 is an enlarged vertical sectional view taken along the line 2—2 of FIG. 1 looking in the direction of the arrows, parts broken away for convenience of illustration;

FIG. 3 is a top plan view of the invention;

FIG. 4 is a perspective view of the invention with the camouflage cloth removed;

FIG. 5 is an exploded perspective view of the structure illustrated in FIG. 4;

FIG. 6 is a fragmentary detail sectional view of one of the connecting joints;

FIG. 7 is a fragmentary perspective view of a pair of the connecting joints;

FIG. 8 is a fragmentary perspective view of another of the connecting joints;

FIG. 9 is a fragmentary exploded perspective view of a connection for the framework;

FIG. 10 is a fragmentary exploded perspective view of another connection of the framework;

FIG. 11 is a fragmentary exploded perspective view of the back pack mounting;

FIG. 12 is a fragmentary exploded perspective view of the cover attachment;

FIG. 13 is a fragmentary bottom plan view of the seat connection; and

FIG. 14 is a transverse sectional view taken along the line 14—14 of FIG. 13 looking in the direction of the arrows.

DESCRIPTION OF THE PREFERRED EMBODIMENT

Referring now to the drawings in detail wherein like reference characters indicate like parts throughout the several figures, the reference numeral 20 indicates generally a hunter's blind constructed in accordance with the invention.

The hunter's blind 20 includes a generally tubular framework having an upright back member 21 and oppositely disposed upright side members 22, 23, as can be best seen in FIGS. 4 and 5. An arcuate tubular member 24 extends between the upper ends of the upright members 21, 22, 23 and is connected to the upper end of the member 21 by a T-connection 25. A transverse tubular member 26 extends horizontally across the open side of the arcuate tubular member 24 and is secured to the member 24 along with the upper end of the member 22 by a bolt 27. The opposite end of the member 26 is connected to the opposite end of the arcuate member 24 and the upper end of the member 23 in a similar manner.

The lower end of the tubular member 21 has a T-head 28 formed thereon to telescopically receive an arcuate side member 29 on one side thereof and an acrcuate side member 30 on the opposite side thereof. The arcuate member 29 is arranged horizontally generally parallel to the arcuate member 24 and has the end opposite the T-head 28 formed with a reduced diameter extension 31. The lower end of the upright member 22 is secured to the free end of the arcuate member 29 by a pair of bolts 32, as illustrated in FIG. 10, although a single bolt in some instances would be sufficient. The lower end of the upright member 23 is secured to the free end of the arcuate member 30 in a similar manner. The free end of the arcuate member 30 has a reduced diameter extension 33 formed thereon similarly to the extension 31.

A generally rectangular back board 34 is secured to the upright member 21 by a pair of vertically spaced spring clips 35, 36, as can be readily seen in FIG. 11. A stop pin 37 extends through the upright member 21 to prevent the spring clip 35 from sliding upwardly with respect to the upright member 21. A pair of headed pins 38 are secured to the upper end of the rear face of the back board 34 to detachably receive buckles 39 secured to the rear ends of a pair of shoulder straps 40. The shoulder straps 40 have an adjustment buckle 41 adjacent the opposite end thereof and have an open hook 42 secured to their free ends. An adjustable waist belt 43 is secured centrally to the lower edge of the front face of the board 34 and is adapted to be buckled about the waist of the hunter.

An upper tubular frame member 44 of generally arcuate form extends horizontally and has its opposite ends telescopically received on oppositely disposed reduced end portions 45 of the frame member 24. A generally horizontal cross member 46 is secured at its opposite ends to the free end portions of the frame member 44 by a bolt 47. The end portions of the member 46 are offset at 48 to provide a gun opening, as can be seen in FIGS. 1 and 4. A transverse handle 49 has its opposite end secured to the frame member 44 and the cross member 46 intermediate the respective opposite ends thereof.

The upright member 22 has a T 50 secured thereto adjacent to but spaced from the reduced end portion 31 of the member 29. The upright member 23 has a similar T 51 adjacent to but spaced from the reduced end portion 33 of the member 30. The T's 50 and 51 have a split leg 52 extending outwardly therefrom. The split leg 52 spreads with a slight spring pressure to grip the generally arcuate horizontal frame member 53 which is telescoped thereon. A generally arcuate horizontal bottom frame member 54 has its opposite ends telescoped onto the reduced end portions 31, 33 of the frame members 29, 30 respectively, as can be best seen in FIG. 4.

A generally rectangular seat board 55 is provided with an arcuate channel 56 along the front edge thereof to engage over the frame member 54 and an arcuate channel 57 along its rear edge to engage over the frame members 29, 30 respectively. Sliding locks 58 are secured to the underside of the seat board 55 by brackets 59 so that the locks can be slid into a position to lock the channels 56 on the respective frames 29, 30, 54. The frame member 26 is provided intermediate its opposite ends with one portion of a Velcro fastener 60 with the opposite portion thereof (not shown) secured centrally of the cross frame member 46 so that they engage when the frame member 46 is in the position illustrated in FIG. 4 tightly adjacent to the frame member 26.

A cover 61 is secured to the rear portion of the hunter's blind 20 by a plurality of hooks 62 which are sewed to the edges of the cover and extend into perforations 63 in the tubular frame members. A cover 64 is similarly secured to the front portion of the hunter's blind 20 and is provided with a sight opening 65, if desired. Normally the material from which the covers 61 and 64 will be formed is of an openwork cloth which permits the hunter to have reasonable vision without in turn being visible to the game.

If desired, pockets may be formed on the inside of the covers 61, 64 for paraphernalia such as shotgun shells, hunting knives, and the like. It should also be noted that while the seat 55 has been disclosed as a flat board, it may be contoured for comfort and even be padded if desired.

In some instances, the hunter's blind may be used with the seat 55 removed and the hunter standing rather than sitting, particularly if sufficient underbrush exists to hide the lower torso. While the hooks 42 have been disclosed as engaging the tubular member 53, it should be understood that they may be extended and hooked to any other of the frame members in order to create a comfortable attachment of the hunter's blind to the body.

Having thus described the preferred embodiments of the invention, it should be understood that numerous structural modifications and adaptations may be resorted to without departing from the spirit of the invention.

We claim:

1. A portable hunter's blind for camouflaging the presence of a hunter and for attachment to the upper torso of the hunter comprising:
    a frame of semi-cylindrical hollow form,
    a first cover attached to and covering the top and sides of said frame, for concealing the back of the hunter,
    means on said frame for detachably securing said frame on the upper torso of the hunter,
    a first forwardly extending frame member loosely secured to the top of said semi-cylindrical frame and adapted to be pushed off when desired,
    and a second cover attached to said first forwardly extending frame member and depending therefrom for concealing the front of the hunter, said first forwardly extending frame member and said second cover constituting a drop front that may be quickly removed by the hunter for shooting from said blind.

2. A device as claimed in claim 1 and including a second forwardly extending frame member detachably secured to said frame and extending forwardly therefrom adjacent to but spaced from the bottom thereof, said second forwardly extending frame member serving to keep said second cover spaced from the body of the hunter adjacent the bottom thereof.

3. A device as set forth in claim 2 and including a third forwardly extending frame member detachably secured to said frame at the bottom thereof,
    and a seat member detachably secured to and extending between said third forwardly extending frame member and said frame.

4. A device as set forth in claim 1 and including handle means on said first forwardly extending frame member for use by the hunter in dropping said first forwardly extending frame member and said second cover preparatory to firing.

5. A device as set forth in claim 1 and including seat means detachably secured to said frame.

6. A device as claimed in claim 1 wherein said covers are of an openwork fabric permitting the hunter to have vision therethrough.

References Cited

UNITED STATES PATENTS

| | | | |
|---|---|---|---|
| 550,762 | 12/1895 | Murphy et al. | 43—1 X |
| 1,031,851 | 7/1912 | January | 43—1 |
| 2,816,297 | 12/1957 | Stanley | 43—1 X |
| 2,992,503 | 7/1961 | Webb | 43—1 |

WARNER H. CAMP, Primary Examiner